United States Patent

Nagou et al.

Patent Number: 5,238,735
Date of Patent: Aug. 24, 1993

[54] MICROPOROUS SHAPED ARTICLE AND PROCESS FOR PREPARATION THEREOF

[75] Inventors: Satoshi Nagou, Tokuyama; Shunichi Nakamura, Hikari; Takeshi Nishibayashi, Tokuyama, all of Japan

[73] Assignee: Tokuyama Soda Kabushiki Kaisha, Tokuyama, Japan

[21] Appl. No.: 475,265

[22] Filed: Feb. 5, 1990

[51] Int. Cl.$^5$ ............................. B32B 3/24; C08J 9/00
[52] U.S. Cl. .............................. 428/304.4; 428/308.4; 428/306.6; 428/372; 428/376; 428/398; 210/500.23; 521/134; 521/143
[58] Field of Search ............... 428/372, 376, 398, 220, 428/304.4, 308.4, 306.6; 210/500.23; 521/134, 143

[56] References Cited

U.S. PATENT DOCUMENTS

| | | | |
|---|---|---|---|
| 3,375,208 | 3/1968 | Duddy | 521/27 |
| 3,627,703 | 12/1971 | Kojima | 521/27 |
| 4,045,352 | 8/1977 | Rembaum et al. | 210/500.23 |
| 4,455,273 | 6/1984 | Harpell et al. | 264/184 |

Primary Examiner—Patrick J. Ryan
Assistant Examiner—Richard P. Weisberger
Attorney, Agent, or Firm—Sherman and Shalloway

[57] ABSTRACT

Disclosed is a microporous shaped polyolefin article comprising a polyolefin and synthetic resin particles dispersed therein and having a softening temperature or a decomposition temperature higher than the shaping temperature of the polyolefin resin, said article having a network structure composed of open-cellular pores with a maximum pore diameter of not more than 5 micrometers, having a porosity of 20 to 90% and being molecularly oriented by stretching. A process for its production is also provided.

11 Claims, No Drawings

MICROPOROUS SHAPED ARTICLE AND PROCESS FOR PREPARATION THEREOF

BACKGROUND OF THE INVENTION

This invention relates to a microporous shaped article having fine network open-cellular pores.

Microporous shaped articles of various shapes having fine network open-cellular pores have been known. For example, microporous films have been widely used as a battery separator or a diaphragm of a capacitor, and hollow filaments have been widely used an air filter, a gas separation membrane, and a membrane for blood purification in a therapeutic field, and as a dialysis membrane. Typically, for production, a cellulose ester or polyester resin is dissolved in a solvent, and the solution is extruded from a spinneret of a double-walled tube and guided into a coagulating liquid. Another known method of production comprises mixing a filler composed of an inorganic compound typified by calcium carbonate and silica with a polyolefin, shaping the mixture in the molten state, and then stretching the shaped product (Japanese Patent Publication No. 49405/1986). The first-mentioned method is easy and can give a shaped article having excellent permeation property. But the shaped article lacks chemical resistance and has inferior mechanical strength and particularly inferior break strength and elongation. In incorporating the hollow filament membranes in a helical or U-shape into a module, the hollow filaments tend to break and lose the excellent mechanical properties of the material. The latter method can give shaped articles form which the above defects have been removed to some extent. But the chemical resistance of the shaped article by the latter method is not sufficient. Furthermore, its pore size cannot be controlled, and its porosity cannot be increased above a certain limit. Thus, it is difficult to have the shaped article exhibit sufficient separation and permeation properties.

It is an object of this invention therefore to provide a microporous shaped article having excellent mechanical strength and chemical resistance in which the pore diameter is controlled to a uniform value.

Another object of this invention is to provide a technique of making a microporous shaped article having excellent separating and permeating abilities easily at low cost.

Other objects of this invention will become apparent from the following description.

According to this invention, there is provided a microporous shaped article comprising a polyolefin and synthetic resin particles dispersed therein and having a softening temperature or a decomposition temperature higher than the shaping temperature of the polyolefin, said article having a network structure composed of open-cellular pores with a maximum pore diameter of not more than 5 micrometers, having a porosity of 20 to 90% and being molecularly oriented by stretching.

The microporous shaped article of this invention is composed mainly of a polyolefin and synthetic resin particles dispersed in the polyolefin.

The polyolefin is not particularly limited, and any conventional polyolefins can be used. Typical examples of polyolefins that can be used particularly suitably include homopolymers of alpha-olefins such as polyethylene, polypropylene, polybutene-1 and polymethylpentene, copolymers of alpha-olefins and other copolymerizable monomers, and mixtures of these. In view of the thermal stability of the microporous article of the invention as well as shapeability, a propylene homopolymer, copolymers of propylene with other copolymerizable monomers and mixtures of these are preferred.

The copolymers of alpha-olefins generally contain at least 90% by weight of an alpha-olefin, particularly propylene and not more than 10% by weight of another copolymerizable monomer. The copolymerizable monomers are not particularly limited, and any known monomers may be used. Generally, alpha-olefins having 2 to 8 carbon atoms, especially ethylene and butene, are preferred.

The synthetic resin particles used in this invention act to induce peeling in the interface with the polyolefin and form open-cellular pores. Accordingly, the synthetic resin particles used have a softening temperature or a decomposition temperature higher, preferably at least 10° C., especially at least 100° C. higher, than the shaping temperature of the polyolefin. Preferably, the synthetic resin particles, when mixed with the polyolefin, are not agglomerated but are dispersed uniformly.

The synthetic resin particles used in this invention may be particles of any known synthetic thermosetting and thermoplastic resins which perform the above function. Above all, particles of thermosetting resin having a crosslinked structure are preferably used. If the softening or decomposition temperature of the synthetic resin particles is lower than the shaping temperature of the polyolefin, the synthetic resin particles may be softened or decomposed to evolve gases during the formation of a shaped article, and a microporous shaped article cannot be obtained.

Specific examples of the synthetic resin particles preferably used in this invention include polyamides such as 6-nylon and 6,6-nylon; fluorine-containing resins such as polytetrafluoroethylene and tetrafluoroethylene-hexafluoropropylene copolymer; polyimides, silicone resins; phenolic resins; benzoguanamine resins; and crosslinked copolymers of styrene, acrylic acid, methacrylic acid, methyl acrylate or methyl methacrylate and a divinyl compound such as divinylbenzene. Particularly a crosslinked polymer is preferably used. Above all, the silicone resins are most preferably used because the interface between the polyolefin and the synthetic resin particles has good peelability, and by stretching, the shaped article can be easily rendered porous.

The synthetic resin particles should have an average particle diameter of 0.01 to 5 micrometers. If the average particle diameter of the synthetic resin particles falls outside the above range, the synthetic resin particles are difficult to disperse in the polyolefin, or they have too large a maximum pore diameter so that the resulting product cannot be used for such applications as liquid separation, reverse osmosis, ultrafiltration and gas separation. To obtain porous shaped articles that can be preferably accepted in such applications, the synthetic resin particles preferably have an average particle diameter of 0.03 to 3 micrometers. Preferably, the synthetic resin particles have as narrow a particle size distribution as possible because with narrower particle size distribution, a more uniform pore size can be obtained. Generally, if the particle size distribution is expressed by $S^2$, namely the average of the square of the difference from the average $$\left(S^2 = \frac{\Sigma (x_i - x_n)^2}{n}\right),$$

$S^2$ is preferably not more than 1.5, especially not more than 0.1. The shape of the synthetic resin particles may be any. Usually, they are preferably in the form of a spherical or elliptical particle having a long-to-short diameter ratio of from 1 to 2 because pores having a uniform diameter can be obtained. The above ratio is especially preferably from 1 to 1.5.

Since the synthetic resin particles used in this invention are synthesized industrially, the above-mentioned uniform particles can be obtained. This uniformity brings about the following advantage over non-uniform particles of an inorganic compound obtained, for example, by crushing fine particles of the compound. Generally, when an inorganic compound is used as a filler, the largest amount of the filler to be added is about 40% by volume based on the polyolefin. Unexpectedly, however, when synthetic resin particles are used as the filler, 55% by volume or even more of them can be filled into the polyolefin. As a result, the porosity of the microporous shaped article obtained can reach even 90%. Moreover, since they have a uniform particle diameter, the dispersion of these particles in the resin is good, and the pores in the microporous shaped article can be controlled nearly to a uniform pore diameter. Another important advantage is that while the inorganic compound has insufficient chemical resistance, the synthetic resin particles have high chemical resistance and are not limited in use for lack of chemical resistance.

The blending ratio between the polyolefin (a) and the synthetic resin particles (b) constituting the microporous shaped article may be determined properly depending upon the properties required of the final microporous shaped article. Most broadly, the proportion of (a) is generally 20 to 80% by weight, preferably 30 to 70% by weight, and the proportion of the synthetic resin particles (b) is generally 80 to 20% by weight, preferably 70 to 30% by weight. The above proportions of the component (a) and the component (b) are important for maintaining the properties of the microporous shaped article within the above-specified ranges and producing the microporous shaped article industrially advantageously. If the proportion of component (b) is lower than the above-specified lower limit, the formation of pores in the resulting microporous shaped article is not sufficient, and the desired porosity sometimes cannot be obtained. If, on the other hand, the proportion of component (b) is higher than the specified upper limit, the shapability of the starting composition tends to become poor. Consequently, sometimes, stretching tends to be unable to be carried out sufficiently, and a sufficient porosity tends to be unable to imparted to the shaped article.

Since the particle diameter of the microporous shaped article is affected by the particle diameter of the synthetic resin particles, its required particle diameter can be obtained by controlling the particle diameter of the synthetic resin particles obtained. Generally, when synthetic resin particles having an average particle diameter of 0.01 to 5 micrometers are used, the resulting microporous shaped article has a maximum pore diameter of not more than 5 micrometers and an average particle diameter of generally 0.02 to 3 micrometers.

Because the synthetic resin particles are uniformly dispersed in the polyolefin, the pores of the microporous shaped article are of a network structure composed of open-cellular pores. The porosity of the microporous shaped article is determined depending upon the blending proportion of the synthetic resin particles, the stretch ratio, etc. and can generally be selected from the range of 20 to 90%, preferably the range of 35 to 80%.

Other properties of the microporous shaped articles are the same irrespective of their shapes, if the production conditions are the same. However, since the shape and the mode of use of the microporous shaped article frequently differ according to usages, some typical properties and shapes are exemplified below.

When the microporous shaped article is in the form of a hollow fiber

The pores of the microporous hollow fiber are small and have excellent uniformity. They have a nitrogen gas permeating amount of generally 100 to 100,000 liters/m$^2$·hr·0.5 atm. It can also be 1000 to 100,000 liters/m$^2$·hr·0.5 atm.

The small maximum pore diameter and the high porosity of the microporous hollow fiber have closely to do with the above desirable amount of nitrogen gas permeated. The above amount of nitrogen gas permeation has closely to do with the water permeability of the hollow fiber of this invention, and generally, the amount of water permeation through the hollow fiber is 1 to 1000 liters/m$^2$·hr·atm.

Since the above maximum pore diameter and the porosity are related to each other, it is not always proper to point out the defects of the hollow fiber if independently these properties fall outside the specified ranges. However, the following can be stated generally.

If the maximum pore diameter exceeds 5 micrometers, the hollow fiber frequently exhibits higher permeation properties for nitrogen and water than the above-specified upper limits. But this is not a preferred embodiment because the hollow fiber in this embodiment is decreased in separation ability between liquid/solid, liquid/gas, liquid/liquid and gas/solid. On the other hand, if the maximum pore diameter is less than 0.01 micrometer, the hollow fiber has excellent separation ability, but the amounts of nitrogen gas permeation and the amount of water permeation markedly decrease, and they are not feasible for practically application. If the porosity becomes lower than the lower limit, the amounts of nitrogen gas permeation and the amounts of water permeation decrease. If the porosity becomes higher than the upper limit, the strength of the hollow fiber becomes weak, and its separation ability might be reduced undesirably. Furthermore, since the upper limit of the porosity is affected by the amount of the synthetic resin particles blended in the method of production. It is not advisable to obtain microporous hollow fibers having a higher porosity than the upper limit by an industrial method of production.

Furthermore, the microporous hollow fiber usually can be produced so as to have a water resistant pressure of as high as 10000 to 50000 mmH$_2$O. However, where hydrophobic microporous hollow fibers having such water resistant pressures are disadvantageous, it is easy to decrease the water resistant pressure, and even to nearly 0 mmH$_2$O. For example, the water resistant pressure can be reduced by immersing the hydrophobic microporous hollow fiber in an aqueous solution containing a small amount (for example, 1 to 3%) of a nonionic surface-active agent having an HLB of 10 to 15, or by adding the above surfactant in advance to a material for the microporous hollow fiber and shaping the mixture.

When the microporous shaped article is in the form of a film

The microporous shaped article in the form of a film exhibits is highest performance as a battery separator. Such a microporous polyolefin film can have an air permeability of 5 to 3000 seconds/100 cc, preferably 5 to 300 seconds/100 cc. Its electrical resistance in propylene carbonate containing 2 moles of lithium perchlorate can be 0.01 to 100 ohms/cm$^2$, preferably 0.01 to 50 ohms/cm$^2$.

The water resistant pressure of the microporous film product, like the above microporous hollow fiber, can be 10000 to 50000 mmH$_2$O, and if required, can be decreased to nearly 0 mmH$_2$O by treatment with a nonionic surfactant having an HLB of 10 to 15.

It is an important requisite that the microporous shaped article of this invention is molecularly oriented by stretching. The pores of the microporous shaped article of the invention has great uniformity. As will be clearly seen from the following description of the manufacturing process, this uniformity is induced by stretching the polyolefin containing a large amount of the synthetic resin particles. For the uniform occurrence of the pores, the stretch ratio is a very important factor, although it is also an important factor to select an additive for finely dispersing the synthetic resin particles in the polyolefin.

Preferably, the stretch ratio of the microporous shaped article of the invention is 1.5 to 30 in terms of an area stretch ratio. It is not always necessary to stretch the article in two directions, and monoaxial stretching alone may give a shaped article having sufficiently good properties. When the shaped article is stretched only in one direction (the longitudinal direction of the hollow filaments), the stretch ratio is preferably 1.5 to 12, preferably 3 to 7. When it is to be stretched biaxially, the stretch ratio in one direction (the longitudinal direction of the hollow fibers) is generally at least 1.2, preferably at least 1.5, and the stretch ratio in the other direction (the circumferential direction of the hollow filaments) is generally at least 1.2, preferably at least 1.5. Most preferably, the shaped article is stretched in the first direction at a stretch ratio of 2 to 5, and in the second direction at a stretch ratio of 2 to 7.

When the microporous shaped article is in the form of a hollow fiber, its outside diameter is 50 micrometers to 5 mm, and its thickness is 10 micrometers to 0.5 mm. If it is in the form of a film, its thickness may be 5 to 200 micrometers.

To obtain the microporous shaped articles, the polyolefin, the synthetic resin particles and the additive must be used in specific combinations of types and amounts. Typical manufacturing processes will now be described in detail.

A process which comprises melt-shaping a mixture composed of 20 to 80% by weight of (a) a polyolefin, 80 to 20% by weight of (b) synthetic resin particles having an average particle diameter of 0.01 to 5 micrometers and having a softening temperature or a decomposition temperature higher than the shaping temperature of the polyolefin, and 0.1 to 20 parts by weight, per 100 parts by weight of the components (a) and (b), of a plasticizer into a desired shape such as a film or hollow fibers, and then stretching the shaped article at an area stretch ratio of 1.5 to 30 times its original area may be typically pointed out. It is generally difficult to mix a large amount of the component (b) uniformly with the component (a). To remove this difficulty, it is important to add a specific amount of the plasticizer at the time of mixing the components (a) and (b). The amount of the plasticizer (c) is 0.1 to 20 parts by weight per 100 parts by weight of the components (a) and (b) combined.

The amount of the plasticizer (c) to be added affects the properties of the microporous shaped articles to a greater extent than the proportions of the components (a) and (b) do. If the amount of the plasticizer (c) is smaller than the above lower limit, the dispersion of the synthetic resin particles in the polyolefin is not good, and a microporous shaped article having uniform pores cannot be obtained. If the amount of the plasticizer (c) is larger than the upper limit, the plasticizer partly flows out during the shaping, and the thickness and diameter of the shaped article cannot be controlled. Consequently, the desired porous shaped article cannot be obtained.

Many plasticizers for use in various synthetic resins are known. Any of these known plasticizers may be used as the plasticizer (c) in this invention. Preferred plasticizers generally used are polyester-type plasticizers and epoxy-type plasticizers. Examples of such plasticizers are described below.

The polyester-type plasticizers are preferably those obtained by esterification reaction of aliphatic or aromatic dibasic or tribasic acids having 4 to 8 carbon atoms with linear dihydric alcohols having 2 to 5 carbon atoms. Specific examples of the polyesters which are particularly preferably used include polyester compounds derived from dibasic or tribasic acids such as sebacic acid, adipic acid, phthalic acid, azelaic acid and trimellitic acid and ethylene glycol, propylene glycol, butylene glycol, neopentyl glycol and long-chain alkylene glycols, especially polyester compounds derived from adipic acid or sebacic acid and propylene glycol, butylene glycol or long-chain alkylene glycols. Compounds obtained by epoxidizing the double bonds of monobasic linear unsaturated acids having 8 to 24 carbon atoms are most preferred as the epoxy-type plasticizers. Specific examples include epoxidized soybean oil and epoxidized linseed oil. These plasticizers may be used singly or in combination.

In a preferred embodiment, a silane-type dispersing agent (d) may be further used in a suitable amount in addition to the plasticizer (c) in order to improve shapability, or to improve the dispersibility of the component (b). The preferred amount of the component (d) is 0.01 to 5 parts by weight per 100 parts by weight of the components (a) and (b) combined.

The additive (d) is not essential, but generally the addition of the component (d) frequently produces favorable results. If, however, the amount of the silane-type dispersant (d) exceeds 5 parts by weight per 100 parts by weight of the components (a) and (b) combined, the silane-type dispersant will partly flow out during the shaping as does the plasticizer. Hence, the amount of the component (d) should preferably be up to 5 parts by weight.

The silane-type dispersing agent may be any of known silane compounds, and examples of preferred silane compounds include alkoxysilane compounds of the formula $R_{4-n} \cdot Si(OR')_n$ in which R and R' each represent an alkyl group such as a methyl, ethyl or propyl group, and n is an integer of 2 or 3. Especially preferred are methyltrimethoxysilane, ethyltrimethoxysilane dimethyldimethoxysilane and diethyldimethoxysilane in which R and R' are a methyl or ethyl group.

Mixing of the components (a), (b) and (c) and optionally (d) may be performed by using any known mixing method. For example, the above components may be simultaneously mixed by using a mixer such as a super-mixer or a Henschel mixer. It is possible to mix components (c) and (d) with component (b), and then melt-knead the polyolefin (a) with the mixture by, for example, a single-screw or twin-screw extruder, and cut and pelletize the extrudate.

It is frequently a desirable embodiment to add known additives such as a coloring agent, a lubricant, an antioxidant, a degradation inhibitor, a hydrophilizing agent and a hydrophobizing agent at the time of mixing the above components, so long as it does not impair the production of the desired microporous shaped articles.

When the above mixture (composition) is melt-shaped into an article of the desired shape and then stretched, the microporous shaped article of the invention is obtained.

When the microporous shaped article of the invention is to be obtained in the form of a hollow fiber, it is generally possible to use a known extruder for hollow fiber production which is equipped with a known double-walled cylindrical spinneret. In the production of hollow fibers generally, the shaped article is monoaxially stretched by a roll stretching method. Or as required, after monoaxial stretching the article is consecutively stretched in the lateral direction by a known tenter stretcher. Alternately, it may be simultaneously stretched in the machine and transverse directions.

When the microporous shaped article is to be shaped into a film or sheet, a sheet-like article is first produced by a general inflation molding method or an extrusion method using a T-die. Then, the sheet-like material is monoaxially stretched by a general roll stretching method. Or after the monoaxial stretching, it is consecutively stretched in the transverse direction by a tenter stretcher or an air inflation stretcher. Alternatively, there may be employed a method in which it is stretched simultaneously in the machine and transverse direction.

Preferably, the microporous shaped article obtained by the above stretching procedure is further heat-treated under tension, for example, at a temperature above the stretching temperature but below the melting point, to set it, and then cooled to room temperature to obtain the final product. In a further preferred embodiment, to improve adhesion, the product is surface-treated by, for example, corona discharge treatment, hydrophilizing treatment or hydrophobizing treatment.

As a result of the polyolefin having been molecularly oriented by stretching or having been further heat-set, the microporous shaped article has markedly increased thermal resistance and improved mechanical strength. When heat-set, the product has markedly improved dimensional stability at room temperature and high temperatures.

By choosing shapes, the microporous shaped articles of the invention may be widely used in various applications. For example, the microporous shaped articles in the form of a hollow fiber can be used as an air filter for dust removal or removing microbes; a gas separation membrane; for water treatment; for production of clean water in the food industry, electronics industry and pharmaceutical industry; as household water purifying device; for blood purification and as artificial lungs and dialysis membrane in the field of medical therapy. They can also be suitably used as a support for precision filtration, ultrafiltration, reverse osmosis or pervaporation. The microporous shaped articles in the form of a film may be suitably used as a battery separator, and also a capacitor, an artificial leather, a synthetic paper-like sheet, a packaging film for a heat-insulating pack, a packaging film for a moisture absorber pack, a bandage, a wear for a surgeon, a face mask, a back sheet for a pharmaceutical paste, and a gas purification filter.

The following Examples and Comparative Examples illustrate the present invention more specifically. The present invention are not to be limited to these Examples.

The various properties of the microporous shaped articles in these examples were measured or determined by the following methods.

Maximum pore diameter (micrometers)

Measured by the methanol bubble point method.

Average pore diameter (micrometers)

Measured by a mercury porosimeter method.

Porosity (%)

With respect to a microporous film, it was determined by specific gravity measuring method and calculated from the following equation.

$$\text{Porosity} = (\text{Pore volume/volume of the microporous film}) \times 100(\%)$$

With respect to a microporous hollow fiber, it was calculated from the following equation in accordance with the mercury porosimeter method.

$$\text{Porosity} = (\text{Pore volume/volume of the microporous hollow fiber}) \times 100(\%)$$

Tensile strength and break elongation

By using an autography made by Shimazu Seisakusho Co., Ltd., the sample (hollow fiber) was pulled at a pulling speed of 200%/min. with an interchuck distance of 50 mm, and the strength and elongation of the sample were measured at break.

Amount of nitrogen gas permeated

Ten microporous hollow fibers were bundled, and by cementing the open portions of the hollow fibers with an epoxy resin, a module was constructed. The effective length of the hollow fibers excepting the epoxy resin-embedded portions was adjusted to 15 cm. A pressure of 0.5 atm was applied 25° C. to the hollow fibers of the module with nitrogen gas. The amount of nitrogen gas which passed through the wall surface of the hollow fibers was measured. The membrane area was determined on the basis of the inside diameters of the fibers.

Amount of water permeated

Ten microporous hollow fibers were bundled, and by cementing the open portions of the hollow fibers with an epoxy resin, a module was constructed. The effective length of the hollow fibers excepting the epoxy resin-embedded portions was adjusted to 15 cm. prior to measuring the water permeating property of the module, the module was immersed in a 2% ethanol solution of a nonionic surfactant having an HLB of 21. Then, water under a pressure of 1 atm was applied, and the amount of water which passed through the wall surface of the hollow fibers was measured. The membrane area was based on the inside diameter of the hollow fibers.

Air permeability (sec/100 cc)

Measured by JIS-P-8117 (Gurley's Air permeability)

Water resistant pressure (mmH$_2$O)

Measured by JIS-K-6328.

Electrical resistance

A pure platinum plate was used as an electrode plate. As an organic electrolyte solution for a lithium cell, 2 moles of lithium perchlorate was dissolved in a propylene carbonate solution, and the electrical resistance was measured at 25° C. at an alternate current of 1 KHz.

Shapability

An unstretched film or hollow fiber was observed visually or by a finger touch, and the results were rated on the following scales.

Good: The surface was free from thickness unevenness and raisings and depressions.

Fair: the surface slightly had thickness unevenness or surface raisings or depressions.

Poor: The sample had thickness unevenness and surface raisings and depressions.

Dispersibility

The microporous shaped article obtained after stretching was observed visually, and the presence of fish eyes was determined on the following scales.

Good: The sample was free from fish eyes.

Poor: Fish eyes were observed.

Stretchability

In the case of a film, the unstretched film was stretched monoaxially and/or biaxially, and the stretched state was evaluated.

In the case of a hollow fiber, the unstretched hollow fiber was stretched longitudinally, and the stretched state was evaluated.

Good: no cutting and break occurred, and the stretching was carried out uniformly.

Slightly poor: The stretching could be done, but an unstretched portion remains partly.

Impossible of stretching: cutting or break occurred, and stretching failed.

In the following Examples and Comparative Examples, the resins, the synthetic resin particles, the plasticizers and the silane-type dispersing agents used were the following commercial products.

Polypropylene: PN-120 (tradename) made by Tokuyama Soda Kabushiki Kaisha, density 0.91 g/cm$^3$, intrinsic viscotity (measured in tetralin at 135° C.) 2.38 dl/g, melting point 160° C.

Propylene/ethylene copolymer: MS-624 (tradename) produced by Tokuyama Soda Kabushiki Kaisha, density 0.09, instrinsic viscosity (measured in tetralin at 135° C., ethylene content 4.7% by weight.

Polyethylene: High density Polyethylene Hizex 1200J (tradename) produced by Mitsui Petrochemical Industries, Ltd., melt index 1.3 g/10 minutes, softening temperature 135° C.

Silicone resin (A): XC99-301 (tradename) produced by Toray Silicone Co., Ltd., spherical particles having an average particle diameter of 4 micrometers, dispersion 1.5, heat decomposition temperature 450° C.

Silicone resin (B): XC99-501 (tradename) producted by Toray Silicone Co., Ltd., spherical particles having an average particle diameter of 2 micrometers, dispersion 0.007, heat decomposition temperature 450° C.

Silicone resin (C): XC-651 (tradename) produced by Toray Silicone Co., Ltd., spherical particles having an average particle diameter of 1.3 micrometers, dispersion 0.01, heat decomposition temperature 450° C.

Silicone resin (D): XC99-621 (tradename) produced by Toray Silicone Co., Ltd., spherical particles having an average particle diameter of 0.8 micrometer, dispersion 0.008, heat decomposition temperature 450° C.

Silicone resin (E): XC99-789 (tradename) produced by Toray Silicone Co., Ltd., spherical particles having an average particle diameter of 0.3 micrometer, dispersion 0.007, heat decomposition temperature 450° C.

Methylmethacrylic acid/divinylbenzene copolymer: MP3000 (tradename) produced by Soken chemical Co., Ltd., spherical particles having an average particle diameter of 0.4 micrometer, dispersion 0.007, heat decomposition temperature 250° C.

Styrene/acryllic acid/divinylbenzene copolymer: Microgel (tradename) producted by Japan Paint Co., Ltd., spherical particles having an average particle diameter of 0.2 micrometer, dispersion 0.007, heat decomposition temperature 270° C.

Benzoguanamine resin (A): Eposter-R-S (tradename) produced by Japan Catalytic Chemical Industry Co., Ltd., spherical particles having an average particle diameter of 0.8 micrometers, dispersion 0.1, heat decomposition temperature 300° C.

Benzoguanamine resin (B): Eposter-R-L (tradename) produced by Japan Catalytic Chemical Industry Co., Ltd., spherical particles having an average particle diameter of 15 micrometers, dispersion 0.3, heat decomposition temperature 300° C.

Polyester-type plasticizer: PN-150 (tradename) produced by Adeka-Argus Co., Ltd.

Epoxy-type plasticizer: Epocizer W100EL (tradename) epoxidized oil produced by Dainippon Ink and Chemicals, Inc.

Silane-type Dispersing agents

Methyltrimethoxysilane: TSL 8113 (tradename) produced by Toshiba Silicone Co., Ltd.

Methyltriethoxysilane: TSL 8123 (tradename) produced by Toshiba Silicone Co., Ltd.

Dimethyldidmethoxysilane: TSL 8117 (tradename) produced by Toshiba Silicone Co. Ltd.

EXAMPLE 1

In each run, the resin, the synthetic resin particles, the plasticizers and the silane-type dispersing agents were mixed for 5 minutes by a supermixer. The mixture was extruded at 230° C. by a twin-screw extruder into a strand, and then cut to pellets.

The resulting pellets were extruded at 215° C. from a die having a lip clearance of 0.8 mm and fitted to an extruder having a screw diameter of 40 mm and an L/D ratio of 30, contacted with a cold having a diameter of 250 mm with water at 40° C. circulating inside, and taken up at 2 m/min. to from a sheet-like material.

The sheet material was stretched monoaxially at a stretch ratio of 4 times at 115° C. between two pairs of hot nip rolls having different rotating speeds. The monoaxially stretched film was then stretched by a tenter stretcher (made By Brückner Co., Ltd.) at 145° C. at a stretch ratio of 2 in a direction perpendicular to the first stretching direction to obtain a microporous polyolefin film.

The properties of the resulting microporous polyolefin films are shown in Table 2.

EXAMPLE 2

In each run, the resins, the synthetic resin particles, the plasticizers and 0.1 part by weight, per 100 parts by weight of the resins and the synthetic resin particles combined, of the silane-type dispersing agent shown in Table 3 mixed for 5 minutes by a supermixer. The mixture was then extruded into a strand at 230° C. by a twin-screw extruder and cut into pellets.

The resulting pellets was extruded at 230° C. through a hollow fiber producing nozzle with a diameter of 40 mm and having a double-walled tube structure and being fitted to an extruder having a screw diameter 40 mm and an L/D ratio of 22, cooled by being put into a water tank through which water at about 20° C. was circulating, and taken up at a speed of 59 to 900 m/min. to obtain an unstretched hollow fiber.

The unstretched hollow fiber was monoaxially stretched at each of the stretch ratio shown in Table 3 at 110° C. between two pairs of Nelson rolls having different rotating speeds to obtain a microporous hollow fiber.

The properties of the resulting microporous hollow fiber are shown in Table 3.

As Comparative Examples, the above procedure was repeated except that calcium carbonate particles were used instead of the synthetic resin particles. The properties of the resulting microporous hollow fibers are also shown in Table 3.

With regard to these microporous hollow fibers, the concentration of $Ca^{2+}$ in water was measured after passage of the hollow fibers used in the measurement of the amount of water. As a result, the $Ca^{2+}$ concentration in water was 7.5 ppm is samples Nos. 1 to 25 and Nos. 28 to 30 in which the synthetic resin particles were used for the production. This concentration was the same as the concentration of $Ca^{2+}$ before passage of the hollow filaments, which was 7.5 ppm. Thus, even when water passed through the microporous hollow fiber, no dissolution of $Ca^{2+}$ was noted. On the other hand, in samples Nos. 26 and 27 which were produced by using calcium carbonate instead of the synthetic resin particles, the concentrations of $Ca^{2+}$ in water after passage through these hollow fibers were 11.3 ppm 7.9 ppm showing an increase of 3.8 ppm and 0.4 ppm respectively from the concentration before passage through the hollow fibers. This shows that $Ca^{2+}$ dissolved in the corresponding amounts.

Pinholes (holes having a diameter larger than 5 micrometers) in the microporous hollow fibers were measured. In samples Nos. 1 to 25 and Nos. 28 to 30, no pinhole was noted in a length of 1000 meters. In samples Nos. 26 and 27, 10 and 18 pidnholes were observed respectively.

The occurrence of pinholes can avoided by using spherical synthetic resin particles having a small size distribution in the microporous shaped articles of the invention. However, when calcium carbonate is used instead of the synthetic resin particles, pinhole formation owing to the agglomeration of particles cannot be avoided as in sample Nos. 26 and 27.

A U-shaped module having membrane area of 0.54 $m^2$ was built by using 2062 microporous hollow fibers having an average loop length of 21 cm by an inside out method (permeating into the inside on the membrane from outside the membrane) pooled water in the river was passed through the module under a pressure difference of 1 $kg/cm^2$ (about 1 atm). This water was put into a filtration-type culture petri dish for contaminating microbes. The microbes were thus sampled and cultured at 35° C. for 24 hours.

The culture was exampled after the culturing to examine whether it gave a malodor. The result was rated as follows:

×: Malodorous
Δ: Slightly malodorous
○: Not malodorous at all

The results are also shown in Table 3.

TABLE 1

| | Polyolefin | | Synthetic resin particler | | | Plasticizer | | Silane-type dispersant | |
|---|---|---|---|---|---|---|---|---|---|
| No. | Type | Amount (wt. %) | Type | Average Particle diameter (μm) | Amount (wt. %) | Type | Amount (wt. %) | Type | Amount (wt. %) |
| 1 | polypropylene | 55 | silicone resin (B) | 2 | 41 | polyester-type plasticizer | 4 | methylmethoxy silane | 1 |
| 2 | propylene-ethylene copolymer | 55 | silicone resin (C) | 1.3 | 41 | polyester-type plasticizer | 4 | methylmethoxy silane | 1 |
| 3 | polypropylene | 55 | silicone resin (C) | 1.3 | 41 | polyester-type plasticizer | 4 | methylmethoxy silane | 1 |
| 4 | " | 54 | silicone resin (D) | 0.8 | 40 | polyester-type plasticizer | 6 | methylmethoxy silane | 1 |
| 5 | " | 50 | methylmethacrylic acid/divynilbenzene copolymer | 0.4 | 38 | polyester-type plasticizer | 12 | methylmethoxy silane | 1 |
| 6 | " | 56 | silicone resin (C) | 0.8 | 40 | epoyx-type plasticizer | 4 | methylmethoxy silane | 1 |
| 7 | " | 56 | silicone resin (C) | 0.8 | 40 | polyester-type plasticizer | 4 | methyltri-ethoxy silane | 1 |

TABLE 1-continued

| | Polyolefin | | Synthetic resin particler | | | Plasticizer | | Silane-type dispersant | |
|---|---|---|---|---|---|---|---|---|---|
| No. | Type | Amount (wt. %) | Type | Average Particle diameter (μm) | Amount (wt. %) | Type | Amount (wt. %) | Type | Amount (wt. %) |
| 8 | " | 56 | silicone resin (D) | 0.8 | 40 | polyester-type plasticizer | 4 | dimethyl-dimethoxy silane | 1 |
| 9 | " | 55 | silicone resin (A) | 4 | 43 | polyester-type plasticizer | 2 | methyltri-methoxy silane | 1 |
| 10 | " | 56 | silicone resin (D) | 0.8 | 44 | — | — | methyltri-ethoxy silane | 1 |
| 11 | " | 50 | styrene/ acrylic acid/ divinyl- benzene copolymer | 0.2 | 38 | polyester-type plasticizer | 12 | methyltri-ethoxy silane | 1 |
| 12 | " | 50 | benzoguan-amino resin (A) | 0.3 | 38 | polyester-type plasticizer | 12 | methyltri-methoxy silane | 1 |

TABLE 2

| No. | Shapeability | Dispersibility | Stretchability | Mode of Stretching | Area Stretch Ratio | Thickness (μm) |
|---|---|---|---|---|---|---|
| 1 | good | good | good | monoaxial stretching | 4 | 38 |
| | | | | biaxial stretching | 8 | 26 |
| 2 | good | good | good | monoaxial stretching | 4 | 40 |
| | | | | biaxial stretching | 8 | 27 |
| 3 | good | good | good | monoaxial stretching | 4 | 26 |
| | | | | biaxial stretching | 8 | 13 |
| 4 | good | good | good | monoaxial stretching | 4 | 45 |
| | | | | biaxial stretching | 8 | 25 |
| 5 | fair | good | fair | monoaxial stretching | 4 | 115 |
| | | | | biaxial stretching | 8 | 63 |
| 6 | good | good | good | monoaxial stretching | 4 | 42 |
| | | | | biaxial stretching | 8 | 25 |
| 7 | good | good | good | monoaxial stretching | 4 | 43 |
| | | | | biaxial stretching | 8 | 25 |
| 8 | good | good | good | monoaxial stretching | 4 | 42 |
| | | | | biaxial stretching | 8 | 25 |
| 9 | good | good | good | monoaxial stretching | 4 | 45 |
| | | | | biaxial stretching | 8 | 30 |
| 10 | fair | good | good | monoaxial stretching | 4 | 35 |
| | | | | biaxial stretching | 8 | 23 |
| 11 | fair | good | fair | monoaxial stretching | 4 | 110 |
| | | | | biaxial stretching | 8 | 58 |
| 12 | good | fair | fair | monoaxial stretching | 4 | 100 |
| | | | | biaxial stretching | 8 | 52 |

| No. | Maximum Pore Diameter (μm) | Average Pore Diameter (μm) | Porosity (%) | Air Permeability (sec/100 cc) | Waterresistant pressure (mmH$_2$O) | Electrical resistance (ohms/cm$^2$) |
|---|---|---|---|---|---|---|
| 1 | 0.7 | 0.35 | 41 | 1750 | 15000 | 72 |
| | 1.9 | 1.0 | 72 | 46 | 9250 | 1 |
| 2 | 0.8 | 0.41 | 37 | 1820 | 17000 | 84 |
| | 2.0 | 1.1 | 69 | 62 | 10000 | 1 |
| 3 | 0.8 | 0.48 | 29 | 1050 | 21000 | 51 |
| | 0.9 | 0.5 | 75 | 30 | 15500 | 2 |
| 4 | 0.5 | 0.23 | 42 | 2200 | 35000 | 47 |
| | 0.6 | 0.28 | 81 | 66 | 18000 | 2 |
| 5 | 0.5 | 0.25 | 44 | 2200 | 34000 | 27 |
| | 0.8 | 0.45 | 88 | 125 | 19000 | 9 |
| 6 | 0.4 | 0.2 | 43 | 2000 | 36000 | 30 |
| | 0.6 | 0.3 | 80 | 70 | 19000 | 2 |
| 7 | 0.4 | 0.18 | 44 | 1950 | 35000 | 33 |
| | 0.6 | 0.28 | 82 | 62 | 19000 | 2 |
| 8 | 0.4 | 0.2 | 46 | 2150 | 37000 | 27 |
| | 0.6 | 0.3 | 80 | 60 | 21000 | 2 |
| 9 | 2.2 | 1.4 | 31 | 1050 | 5000 | 95 |
| | 4.5 | 2.5 | 68 | 30 | 3800 | 3 |
| 10 | 0.4 | 0.2 | 49 | 2500 | 34000 | 49 |
| | 0.7 | 0.4 | 95 | 88 | 17000 | 1 |
| 11 | 0.3 | 0.15 | 25 | 2500 | 42000 | 60 |
| | 0.5 | 0.3 | 80 | 200 | 20000 | 12 |
| 12 | 0.6 | 0.33 | 31 | 2550 | 38000 | 42 |
| | 0.9 | 0.5 | 78 | 180 | 18000 | 19 |

TABLE 3

| (*) No. | Resin Type | Resin Amount (wt. %) | Synthetic resin Particler Type | Average Particle diameter (μm) | Amount (wt. %) | Amount Of the Plasticizer added (parts by weight) | Take-up speed (m/min) | Stretch ratio | Shape-ability |
|---|---|---|---|---|---|---|---|---|---|
| 1 | polypropylene | 57 | silicone resin (A) | 4 | 43 | 2 | 450 | 4.5 | good |
| 2 | " | 57 | silicone resin (B) | 2 | 43 | 2 | 450 | 4.5 | good |
| 3 | " | 57 | silicone resin (B) | 2 | 43 | 2 | 700 | 4.5 | good |
| 4 | " | 57 | silicone resin (B) | 2 | 43 | 2 | 900 | 4.5 | good |
| 5 | " | 57 | silicone resin (C) | 1.3 | 43 | 4 | 450 | 4.5 | good |
| 6 | " | 57 | silicone resin (C) | 1.3 | 43 | 4 | 700 | 4.5 | good |
| 7 | " | 57 | silicone resin (C) | 1.3 | 43 | 4 | 900 | 4.5 | good |
| 8 | " | 57 | silicone resin (D) | 0.8 | 43 | 4 | 450 | 4.5 | good |
| 9 | propylene/ethylene copolymer | 57 | silicone resin (B) | 2 | 43 | 2 | 450 | 4.5 | good |
| 10 | polyethylene | 57 | silicone resin (B) | 2 | 43 | 2 | 450 | 4.5 | good |
| 11 | " | 55 | methylmethacrylic acid/divinylbenzene copolymer | 0.4 | 45 | 4 | 450 | 4.5 | good |
| 12 | " | 55 | styrene/acrylic acid/divinylbenzene copolymer | 0.2 | 45 | 4 | 450 | 4.5 | good |
| 13 | " | 55 | benzoguanamine resin (A) | 0.3 | 45 | 4 | 450 | 4.5 | fair |
| 14 | " | 50 | silicone resin (B) | 2.0 | 50 | 2 | 50 | 5 | good |
| 15 | " | 50 | silicone resin (B) | 2.0 | 50 | 2 | 50 | 6 | good |
| 16 | " | 40 | silicone resin (B) | 2.0 | 60 | 4 | 50 | 5 | good |
| 17 | " | 40 | silicone resin (B) | 2.0 | 60 | 4 | 50 | 6 | good |
| 18 | " | 50 | silicone resin (D) | 0.8 | 50 | 2 | 50 | 5 | good |
| 19 | " | 50 | silicone resin (D) | 0.8 | 50 | 2 | 50 | 6 | good |
| 20 | " | 40 | silicone resin (D) | 0.8 | 60 | 4 | 50 | 5 | good |
| 21 | " | 40 | silicone resin (D) | 0.8 | 60 | 4 | 50 | 6 | good |
| 22 | " | 50 | silicone resin (E) | 0.3 | 50 | 2 | 50 | 5 | good |
| 23 | " | 50 | silicone resin (E) | 0.3 | 50 | 2 | 50 | 6 | good |
| 24 | " | 40 | silicone resin (E) | 0.3 | 60 | 4 | 50 | 5 | good |
| 25 | " | 40 | silicone resin (E) | 0.3 | 60 | 4 | 50 | 6 | good |
| 26 | " | 40 | calcium carbonate | 3 | 60 | 2 | 450 | 5 | good |
| 27 | " | 40 | calcium carbonate | 0.08 | 60 | 4 | 450 | 5 | good |
| 28 | " | 85 | silicone resin (B) | 2 | 15 | 1 | 450 | 5 | good |
| 29 | " | 15 | silicone resin (B) | 2 | 85 | 10 | take-up impossible | — | poor |
| 30 | " | 55 | benzoguanamine resin (B) | 15 | 45 | 1 | 450 | 5 | good |

| No. | Dispersibility | Stretchability | Inside diameter (mm) | Tensile strength (kg/per hollow fiber) | Break elongation (%) | Maximum Pore diameter (μ) | Porosity (%) | Amount of $N_2$ gas permeated (l/m² · hr · 0.5 atm) | Amount of water permeated (l/m² · hr · atm) | Occurrence of malodor |
|---|---|---|---|---|---|---|---|---|---|---|
| 1 | good | good | 2.0 | 7.0 | 30 | 1.8 | 45 | 10000 | 6.3 | Δ |

TABLE 3-continued

| | | | | | | | | | | |
|---|---|---|---|---|---|---|---|---|---|---|
| 2 | good | good | 2.0 | 7.2 | 36 | 0.45 | 40 | 1280 | 2.6 | ○ |
| 3 | good | good | 1.5 | 7.6 | 23 | 0.25 | 52 | 1240 | 3.9 | ○ |
| 4 | good | good | 1.0 | 2.6 | 24 | 0.19 | 48 | 190 | 4.4 | ○ |
| 5 | good | good | 2.0 | 9.4 | 33 | 0.22 | 48 | 1370 | 3.3 | ○ |
| 6 | good | good | 1.5 | 5.4 | 35 | 0.18 | 54 | 1250 | 2.8 | ○ |
| 7 | good | good | 1.0 | 3.4 | 33 | 0.17 | 56 | 640 | 4.1 | ○ |
| 8 | good | good | 1.0 | 6.0 | 28 | 0.21 | 58 | 1100 | 4.0 | ○ |
| 9 | good | good | 2.0 | 5.5 | 40 | 0.45 | 55 | 1150 | 4.0 | ○ |
| 10 | good | good | 2.0 | 6.2 | 205 | 0.40 | 54 | 1200 | 3.3 | ○ |
| 11 | fair | fair | 1.8 | 3.9 | 26 | 0.18 | 52 | 900 | 2.5 | ○ |
| 12 | fair | fair | 1.8 | 4.0 | 24 | 0.18 | 58 | 650 | 2.6 | ○ |
| 13 | fair | fair | 1.8 | 3.6 | 30 | 0.16 | 61 | 480 | 2.0 | ○ |
| 14 | good | good | 0.34 | 0.76 | 34 | 0.28 | 60 | 4440 | 14 | ○ |
| 15 | good | good | 0.33 | 0.83 | 22 | 0.52 | 70 | 19590 | 80 | ○ |
| 16 | good | good | 0.35 | 0.55 | 22 | 0.94 | 43 | 50030 | 328 | ○ |
| 17 | good | good | 0.33 | 0.61 | 16 | 1.04 | 51 | 55690 | 382 | ○ |
| 18 | good | good | 0.34 | 0.80 | 31 | 0.22 | 56 | 3020 | 10 | ○ |
| 19 | good | good | 0.32 | 0.81 | 22 | 0.38 | 78 | 8270 | 27 | ○ |
| 20 | good | good | 0.34 | 0.69 | 30 | 0.78 | 50 | 39880 | 372 | ○ |
| 21 | good | good | 0.33 | 0.69 | 22 | 0.94 | 55 | 42530 | 379 | ○ |
| 22 | good | good | 0.34 | 0.93 | 40 | 0.32 | 66 | 21000 | 80 | ○ |
| 23 | good | good | 0.33 | 0.99 | 29 | 0.32 | 67 | 25000 | 120 | ○ |
| 24 | good | good | 0.34 | 0.39 | 12 | 0.55 | 44 | 56580 | 808 | ○ |
| 25 | good | good | 0.33 | 0.46 | 12 | 0.63 | 57 | 59480 | 809 | ○ |
| 26 | good | good | 2.0 | 8.3 | 21 | 2.35 | 44 | 12000 | 110 | X |
| 27 | good | good | 1.5 | 6.2 | 35 | 0.21 | 52 | 1600 | 4.4 | ○ |
| 28 | good | good | 1.0 | 7.0 | 31 | 0.004 | 23 | 22 | 0 | — |
| 29 | — | — | — | — | — | — | — | — | — | — |
| 30 | fair | fair | 2.0 | 4.9 | 25 | 8 | 44 | 34000 | 400 | X |

(*)Nos. 26–30 are comparisons

We claim:

1. A microporous shaped polyolefin article comprising
   (a) 20 to 80% by weight of a polyolefin,
   (b) 80 to 20% by weight of synthetic resin particles,
   (c) 0.1 to 20 parts by weight, per 100 parts by weight of components (a) and (b), of a plasticizer for finely dispersing the synthetic resin particles in the polyolefin,
   said synthetic resin particles having a softening temperature of a decomposition temperature higher than the shaping temperature of the polyolefin,
   said article having been stretched at a stretch ratio ranging from 1.5 to 30 so that the polyolefin is molecularly oriented,
   said article having a network structure composed of open-cellular pores with a maximum pore diameter of not more than 5 micrometers and having a porosity of 20 to 90%.

2. The microporous shaped polyolefin article of claim 1 in which the synthetic resin particles are particles of a crosslinked polymer.

3. The microporous shaped polyolefin article of claim 2 in which the synthetic resin particles are particles of a silicone resin, a copolymer of an unsaturated carboxylic acid and a divinyl compound, or a benzoguanamine resin.

4. The microporous shaped polyolefin article of claim 1 further characterized as a hollow fiber.

5. The microporous shaped polyolefin article of claim 1 further characterized as a film.

6. The microporous shaped polyolefin article of claim 1 in which the polyolefin is a propylene homopolymer or a copolymer of propylene with another olefin.

7. The microporous shaped polyolefin article of claim 1, wherein said synthetic resin particles have an average particle diameter of 0.01 to 5 micrometers.

8. The microporous shaped polyolefin article of claim 1, wherein said synthetic resin particles have an average particle diameter of 0.03 to 3 micrometers.

9. The microporous shaped polyolefin article of claim 1, wherein said synthetic resin particles have a particle size distribution, expressed as the average of the square of the difference from the average, of not more than 1.5.

10. The microporous shaped polyolefin article of claim 1, wherein the blending ratio between the polyolefin (a) and the synthetic resin particles (b) is 70 to 30% by weight of (a) and 30 to 70% by weight of (b).

11. The microporous shaped polyolefin article of claim 1, further comprising (d) 0.01 to 5 parts by weight of a silane dispersing agent per 100 parts by weight of components (a) and (b).

* * * * *